H. S. MEAD.
Revolving Harrow.
No. 48,575.
Patented July 4, 1865.
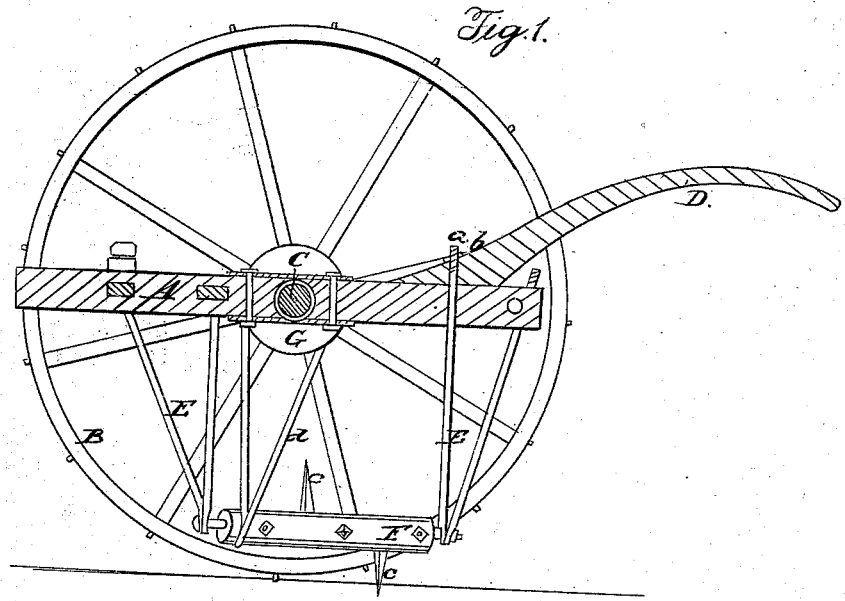
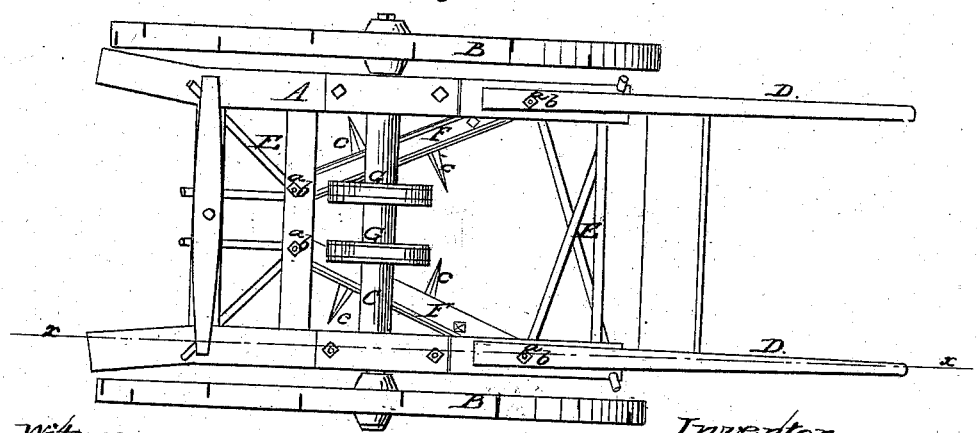
Witnesses:
Inventor:
H S Mead

UNITED STATES PATENT OFFICE.

H. S. MEAD, OF GLOVERSVILLE, NEW YORK.

IMPROVEMENT IN CULTIVATORS.

Specification forming part of Letters Patent No. 48,575, dated July 4, 1865.

*To all whom it may concern:*

Be it known that I, H. S. MEAD, of Gloversville, in the county of Fulton and State of New York, have invented a new and Improved Cultivator and Hoeing-Machine; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\ x$, Fig. 2; Fig. 2, a plan or top view of the same.

Similar letters of reference indicate like parts.

This invention relates to a new and useful machine for cultivating and hoeing the soil; and it consists in the employment or use of two shafts placed in an oblique position relatively with each other, provided with teeth, and operated from the shaft or axle of the wheels on which the machine is mounted, all being arranged as hereinafter set forth, whereby the earth may be cast either toward or from the plants, weeds thoroughly eradicated, and the soil pulverized and lightened up to promote the growth of the plants.

A represents a rectangular frame, which is mounted on two wheels, B B, the axle C of which is allowed to rotate freely in the frame, the wheels being attached to the axle.

The frame A is provided with handles D D for the purpose of guiding the machine, and pendent rods E extend down from the frame A, in the lower ends of which two shafts, F F, are fitted. These shafts have an oblique position relatively with each other, as shown clearly in Fig. 2, the front ends of the rollers being nearer together than the rear ends, and the shaft may be raised or lowered by means of nuts and screws $a\ b$ at the upper ends of the pendent rods E.

The shafts F are provided with either teeth $c$, like harrow-teeth, or they may have shovel-teeth to operate like hoes. The harrow-teeth are represented in the drawings. The shafts are rotated by cross-belts $d$ from pulleys G on the axle C. These cross-belts cause the shafts to be rotated in such a direction as to throw the earth from the plants as the machine is drawn along. They may be made to rotate in a reverse direction and throw the earth to the plants by using straight belts.

This machine will prove very efficient in pulverizing the soil and eradicating weeds. The harrow or the shovel-teeth are used according to the character of the work to be performed, the teeth being made to penetrate the soil at a greater or less depth by adjusting the shafts F higher or lower, as previously described.

I am aware that rotating cylinders armed with teeth or shovels have before been employed, as well as various rotating contrivances carrying teeth or shovels. Therefore I do not wish to be understood as claiming this idea, broadly.

Having thus described my invention, I claim as new and desire to secure by Letters Patent—

The oblique rotating toothed shafts F, fitted at the lower ends of pendants attached to the frame A of the machine, and arranged to operate in the manner substantially as and for the purpose herein set forth.

H. S. MEAD.

Witnesses:
J. G. WARD,
A. J. WILSON.